Sept. 27, 1932.  E. D. TILLYER  1,880,029
OPHTHALMIC LENS
Filed Nov. 4, 1929
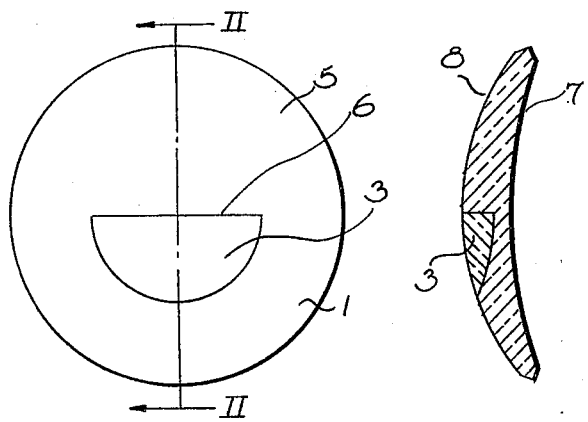
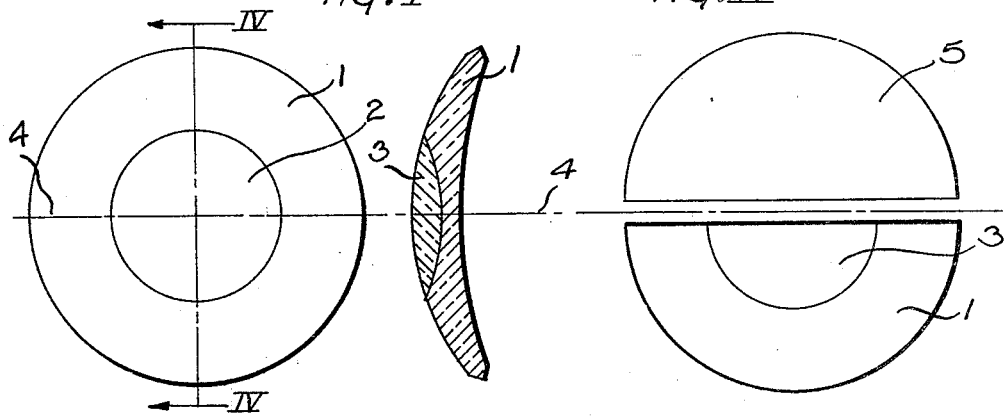
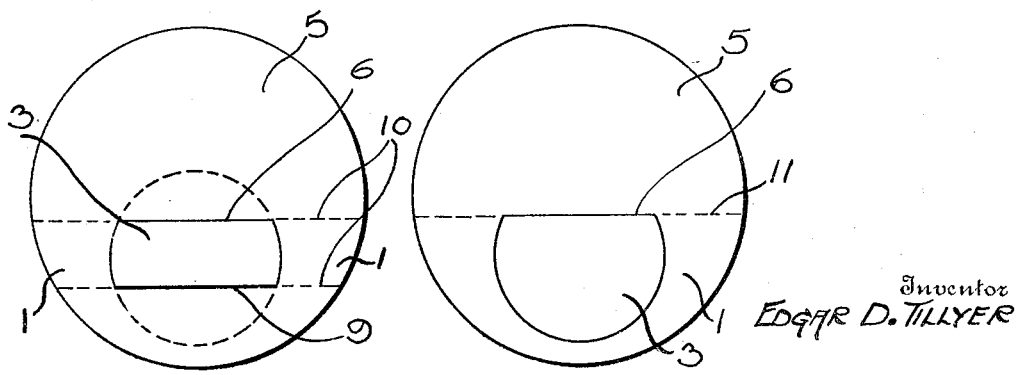
Inventor
EDGAR D. TILLYER
By Harry H. Styll
Attorney Patented Sept. 27, 1932

1,880,029

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed November 4, 1929. Serial No. 404,664.

This invention relates to ophthalmic lenses and has particular reference to an improved multifocal lens and blank and to a process of making the same.

The principal object of this invention is to provide a simple and economical form of multifocal lens which can be made without fear of warping during the process of manufacture.

Another object of the invention is to provide improved means and process of forming a fused bifocal or multifocal lens wherein a composite piece of glass formed of two pieces of glass having optical surfaces fused face to face may be fused edge to edge with another piece of glass without causing the said edge and fused optical surfaces to warp and become distorted and impractical for use.

Another object of this invention is to provide a process for making such a multifocal lens wherein the reading portion is not restricted as to position within the distance field.

Another object of this invention is to provide means whereby the lens may be made monocentric if desired.

Other objects and advantages of the invention will become apparent from the following description taken in connection with the accompanying drawing and it will be apparent that many changes may be made in the details of construction, arrangements of parts and steps of the process without departing from the spirit of the invention as expressed in the accompanying claims. I, therefore, do not wish to be limited to the exact details shown and described as the preferred forms only have been shown by way of illustration.

Referring to the drawing:

Fig. I is a front view of an ophthalmic lens embodying the invention.

Fig. II is a section on line II—II of Fig. I.

Fig. III is a front view of the lens at a certain stage in the process.

Fig. IV is a section on line IV—IV of Fig. III.

Fig. V is a front view of the lens at another stage of the process.

Fig. VI is a front view of an ophthalmic lens embodying a modified form of the invention.

Fig. VII is a front view of an ophthalmic lens embodying a further modification of the invention.

It has long been apparent that multifocal lenses having a full circular reading field have various drawbacks and that the most satisfactory form of multifocal lens has a substantially straight line forming the top of the reading field at the juncture with the distance portion. In manufacturing this type of lens various methods have been tried, the most satisfactory for some purposes being to embed a full circular reading field in a distance portion and then cut through both the reading field and distance portion, thus forming two substantially semi-circular portions, and then to unite one of these portions with another semi-circular portion having no reading field. This practice was outlined in Reissue Patent No. 16.830, but it has been found that the process disclosed therein is not entirely satisfactory from a manufacturing standpoint. One of the defects of this type of lens is that the composite portion of the major blank which has the reading segment fused in a countersink formed therein and the separate portion of the major blank which is fused edge to edge with said composite piece of glass have the same fusion point and when subjected to heat, both portions melt and join together. This causes the fusion edge at the top of the segment and the portion of the countersink curve which underlies the segment adjacent the fusion edge to distort and become blurred and impractical for use.

It is the prime object of this invention to depart from the process disclosed in the foregoing patent and provide an improved means of forming a multifocal lens of the desired type, wherein the top of the reading field and portion adjacent said top will not distort and become blurred and impractical for use.

Referring to the drawing wherein similar characters of reference denote corresponding parts throughout the several views, the numeral 1 denotes the major portion of my improved lens, into which I grind a countersink 2, which for purposes of this description may be in the geometrical center of the major portion 1.

In order to avoid the troubles of the prior art, I preferably form my major portion 1 of the kind of glass known in the industry as hard crown, which is distinguished from soft crown by its higher fusion point. Having formed my countersink 2, I next embed, preferably by fusing, a button 3 therein. The button 3 may be of the usual flint glass having a different index of refraction to the hard crown glass used for the major portion 1.

The foregoing steps of the process are shown in Figs. III, and IV of the drawing. After the button 3 has been inserted in the major blank 1, I separate the said major blank 1 along the line 4—4 which preferably passes through the geometrical center of the blank 1, although as will be presently shown this is not necessary. I next fuse a portion 5 to the separated part of the blank 1 and again depart from the prior art by using a different kind of crown glass to that used for the portion 1 of the original blank. The portion 5 is made of similar shape to the part of the separated blank 1 used for the lower portion, but is made of a soft crown glass having a lower fusion point than the hard crown glass previously described. Both of the crown glasses used may have the same index of refraction, from which it follows that the line 4—4 will disappear from the fused blank except at the portion designated with numeral 6 in Fig. I where the reading segment joins the major field. The portion surrounding the segmental field 3 will present an unbroken surface pleasing to the eye.

I can now place any desired base curve 7 on the concave surface and a desired prescriptive curve 8 on the other side, thus completing my improved multifocal lens, as shown in Fig. II.

The foregoing process may be carried through without hindrance from the drawbacks associated with the prior art. Previously it has been attempted to fuse together the upper and lower portions of this type of lens when using a single kind of crown glass for both portions. This process results in a warping of the edges of the glass during fusion and also distorts the countersink curve adjacent the fusion edge and causes the reading field to become blurred and impractical for use. This warping is due to the double fusing process necessarily employed when making this type of lens, as both the segment and the upper portion are fused in two separate operations, that is, the segment is first fused in the countersink, then divided, and then fused edge to edge with another portion of glass, the second fusing causing the first fused surfaces to distort. In my improved process I support the flint button with a hard crown base having a high fusion point, and fuse to this my upper portion of soft crown having a low fusion point. It will be obvious that in this way I can support the segment in the hard crown base until the soft crown portion, which has a lower fusion point, melts to the shape of the hard crown edge and fuses thereto without causing said hard crown edge and segment portion to melt and distort. This avoids the drawbacks associated with fusing the blank in two operations and greatly facilitates the process of manufacturing this improved type of multifocal lens. It will also be obvious that in the process previously described I have formed a monocentric lens inasmuch as the line of joinder 6 passes through the optical axis of the segment 3. This is an advantageous type of lens to form as there is no jump in the line of vision when passing from one field into the other but I do not necessarily have to confine my process to this type of lens.

In Fig. VI, I have illustrated a modification of the foregoing process. This type of lens is made with a straight line 6 at the top of the segment portion and another straight line 9 at the lower portion of the segment. I preferably form this lens by embedding my segment 3 below the geometrical center of the major lens blank 1. I next separate the blank along the dotted lines 10 lying on either side of the optical center of the segment and thus have a strip of hard crown glass having a segmental portion 3 in its center. To the upper and lower portions of this strip I next fuse two pieces of soft crown glass to give a circular lens shape, and it will be obvious that as in the previously described process the dotted lines 10 will disappear leaving the straight lines 6 and 9 at the points of joinder of the segment to the major field.

In a further modification shown in Fig. VII, I also embed my segment portion 3 lower in the major field 1 than in the process illustrated in Fig. III. I next separate the blank into two portions along the dotted line 11, which is preferably substantially midway between the optical center of the segment portion 3 and its upper edge. I can now fuse a soft crown portion 5 to the upper straight edge of the major portion 1 whereby the line 11 will disappear except at the portion 6.

From the foregoing it will be apparent that I have provided simple means for overcoming most of the objections associated with the prior art forms of the improved type of multifocal. The warping of the edges associated with the double fusing process has been eliminated and a simple method of manufacturing the straight top or desired form of multifocal lens has been made available. By providing a substantial background of hard crown glass for the reading segment and fusing thereto a soft crown glass for the upper portion a novel and ingenious means of overcoming the disadvantages associated with the prior art has been provided.

Having described my invention, I claim:

1. The process of making a bifocal or multifocal lens blank comprising fusing a lens blank in a larger lens blank of different lens medium, dividing the combined lens blank through the smaller blank and fusing to one of the divided portions of the combined blank, a piece of lens medium having a different fusion point than the larger blank.

2. The process of making a bifocal or multifocal lens comprising fusing a lens blank in a larger lens blank of different lens medium, dividing the combined lens blanks through the smaller blank, fusing to one of the divided portions of the combined blank, a piece of lens medium having a different fusion point than the larger blank and surfacing the faces of the united portions to the desired optical curvatures.

3. The process of making a bifocal or multifocal lens blank comprising fusing a lens blank in a larger lens blank of a different index of refraction, dividing the combined lens blanks through the smaller blank and fusing to one of the divided portions of the combined lens blanks a piece of lens medium having a different fusion point than the larger blank.

4. The process of making a bifocal or multifocal lens blank comprising fusing a lens blank in a larger lens blank of a different index of refraction, dividing the combined lens blanks through the smaller blank and fusing to one of the divided portions of the combined lens blanks a piece of lens medium having a lower fusion point than the major portion, but a similar index of refraction.

5. The process of making a bifocal or multifocal lens blank comprising fusing a lens blank in a larger lens blank of a different index of refraction, dividing the combined lens blanks through the geometrical center of the smaller blank and fusing to one of the divided portions of the combined lens blanks a piece of lens medium having a lower fusion point than the major portion.

6. The process of making a bifocal or multifocal lens comprising fusing a lens blank in a larger lens blank of a different index of refraction with their geometrical centers coincident, dividing the combined lens blanks through the said geometrical centers, fusing to one of the divided portions of the combined lens blanks along the divided edge, a piece of lens medium having a lower fusion point than the larger blank, but a similar index of refraction and surfacing the faces of the united portions to the desired optical curvatures.

7. The process of making a bifocal or multifocal lens blank comprising fusing a lens blank in a larger lens blank of a different index of refraction with its geometrical center spaced from the geometrical center of the larger lens blank, dividing the combined lens blanks through the smaller blank leaving a dividing line of the shape desired and fusing to said dividing line a piece of lens medium having a lower fusion point than the larger blank.

8. The process of making a bifocal or multifocal lens comprising placing two pieces of lens medium edge to edge on an abutting line of jointure, both pieces of said medium having the same index of refraction but each having a different fusion point from the other, and subjecting the abutted sections to the action of heat until the section having the lower fusion point melts and fuses to the section having the higher fusion point before the said last named section has fused.

9. The process of making a bifocal or multifocal lens comprising placing two pieces of lens medium edge to edge on an abutting line of jointure, one section being of one kind of glass only and the other section of two kinds of glass, one of which has the same index of refraction as the first named piece of glass but a higher fusion point, and subjecting the abutted sections to the action of heat until the section having the lower fusion point melts and fuses to the section having the higher fusion point before the said last named section has fused.

10. The process of making a bifocal or multifocal lens comprising placing two pieces of lens medium edge to edge on an abutting line of jointure, both pieces of said medium having the same index of refraction but each having a different fusion point from the other, subjecting the abutted sections to the action of heat until the section having the lower fusion point melts and fuses to the section having the higher fusion point before the said last named section has fused and surfacing the faces of the united portions to the desired optical curvatures.

11. The process of making a bifocal or multifocal lens comprising placing two pieces of lens medium edge to edge on an abutting line jointure, one section being of one kind of glass only and the other section of two kinds of glass, one of which has the same index of refraction as the first named piece of glass but a different fusion point, subjecting the abutted sections to the action of heat until the section having the lower fusion point melts and fuses to the section having the higher fusion point before the said last named section has fused and surfacing the faces of the united portions to the desired optical curvatures.

EDGAR D. TILLYER.